United States Patent [19]

Graefe

[11] Patent Number: 5,074,770

[45] Date of Patent: Dec. 24, 1991

[54] INTEGRATED VACUUM FORMING/REACTION INJECTION MOLDING APPARATUS FOR MANUFACTURING A SHAPED POLYMERIC LAMINATE ARTICLE

[75] Inventor: Peter U. Graefe, Wayside, N.J.

[73] Assignee: Intellex Corporation, Uniondale, N.Y.

[21] Appl. No.: 400,722

[22] Filed: Aug. 30, 1989

[51] Int. Cl.⁵ .................. B29C 45/14; B29C 45/16
[52] U.S. Cl. .................... 425/117; 425/127; 425/543; 425/546
[58] Field of Search .............. 55/71, 74; 264/83; 425/543, 127, 129.1, 437, 116, 117, 4 R, 577, 546, 817 R

[56] References Cited

U.S. PATENT DOCUMENTS

| | | | |
|---|---|---|---|
| 2,515,112 | 7/1950 | Burford, III et al. | 423/241 |
| 3,692,442 | 9/1972 | Gerbert | 425/4 R |
| 3,743,704 | 7/1973 | West | 55/71 |
| 3,820,580 | 4/1989 | Hocker et al. | 156/643 |
| 3,933,562 | 1/1976 | Cruckshank et al. | 425/388 |
| 4,053,545 | 11/1977 | Fay | 264/46.4 |
| 4,215,096 | 7/1990 | Sinha et al. | 423/239 |
| 4,292,287 | 9/1981 | Orlett et al. | 264/117 |
| 4,312,693 | 1/1982 | Salensky et al. | 156/272 |
| 4,315,808 | 2/1982 | Imada et al. | 264/22 |
| 4,317,788 | 3/1982 | Imada et al. | 264/22 |
| 4,452,679 | 6/1984 | Dunn et al. | 427/38 |
| 4,479,914 | 10/1984 | Baumrucker | 425/817 R |
| 4,493,627 | 1/1985 | O'Malley et al. | 425/437 |
| 4,546,899 | 10/1985 | Williams | 264/46.6 |
| 4,548,867 | 10/1985 | Ueno et al. | 264/22 |
| 4,565,511 | 1/1986 | Ramisch | 425/543 |
| 4,594,231 | 6/1986 | Nishino et al. | 423/210 |
| 4,661,391 | 4/1987 | Schröder et al. | 425/129.1 |
| 4,668,567 | 5/1987 | Williams | 425/127 |
| 4,690,097 | 9/1987 | Fukuta et al. | 118/723 |
| 4,701,290 | 10/1987 | Eschwey et al. | 264/83 |
| 4,714,650 | 12/1987 | Obayashi et al. | 428/265 |
| 4,752,428 | 6/1988 | Williams et al. | 264/83 |
| 4,764,405 | 8/1988 | Bauman et al. | 264/83 |
| 4,766,025 | 8/1988 | Sanok et al. | 264/46.6 |
| 4,771,110 | 9/1988 | Bauman et al. | 525/110 |
| 4,784,904 | 11/1988 | Wood et al. | 264/45.3 |
| 4,800,053 | 1/1989 | Bauman et al. | 264/83 |
| 4,822,652 | 4/1989 | Sempio et al. | 264/46.8 |
| 4,828,871 | 5/1989 | Strobel et al. | 427/39 |
| 4,836,901 | 6/1989 | Manabe et al. | 264/26 |
| 4,844,944 | 7/1989 | Graefe et al. | 427/400 |
| 4,844,955 | 7/1989 | Graefe et al. | 428/420 |

FOREIGN PATENT DOCUMENTS 2148786 6/1985 United Kingdom.

OTHER PUBLICATIONS

Coopes et al., "Gas Plasma Treatment of Polymer Surfaces", *J. Macromol. Sci.-Chem.*, A 17 (2), pp. 217-226 (1982).

*Primary Examiner*—Willard E. Hoag
*Attorney, Agent, or Firm*—Rocco S. Barrese; Peter G. Dilworth

[57] ABSTRACT

An apparatus is provided for the integrated vacuum forming/reaction injection molding of a shaped polymeric laminate article, e.g., an item of sanitary ware such as a bathtub or a motor vehicle body panel, possessing a vacuum formed thermoplastic resin cosmetic layer bonded to a thermoset resin backing layer. In a preferred embodiment, the exposed surface of a vacuum formed preform is treated within the cavity of a sealed reaction injection mold, e.g., by plasma or chemically reactive gas, to modify the polymeric structure of the resin at such surface without affecting the bulk properties of the resin and thereby improve the adherent property of the preform for the subsequently formed theremoset resin layer.

12 Claims, 4 Drawing Sheets

INTEGRATED VACUUM FORMING/REACTION INJECTION MOLDING APPARATUS FOR MANUFACTURING A SHAPED POLYMERIC LAMINATE ARTICLE

BACKGROUND OF THE INVENTION

This invention relates to an integrated apparatus and process for vacuum forming a thermoplastic resin sheet to provide a preform followed by reaction injection molding of a thermoset resin against the preform to provide a shaped polymeric laminate article.

In thermoforming, a thermoformable polymeric sheet, e.g., one fabricated from a thermoplastic resin such as poly(methyl methacrylate) (PMMA), is heated to thermoforming temperature and with the use of positive or negative pressure (vacuum), is then conformed to the shaping surfaces of a mold. When a vacuum is used to draw the heat-softened sheet against the shaping surfaces of the mold, the process is referred to as vacuum forming.

Reaction injection molding involves a one-shot injection of a flowable, substantially homogeneous mixture of polymerizable components into a sealed mold where rapid polymerization occurs resulting in a molded resin product which may be of thermoplastic, elastomeric or thermosetting variety depending on the relative number of crosslinks which may be present. In a typical reaction injection molding process, the viscosity of the resin-forming composition introduced into the mold cavity ranges from about 50 cps to about 10,000 cps, preferably from about 500 cps to about 5000 cps. Mold temperatures generally vary from about ambient to about 150° C. and mold cavity pressures generally range from about 30 psig to about 200 psig, preferably from about 50 psig to about 100 psig.

In a reaction injection molding process, the polymerization reaction takes place fairly rapidly, e.g., in less than about 5 minutes and frequently in less than about 2 minutes For further details regarding known types of reaction injection molding apparatus and processes, reference may be made to Sweeney, "Introduction to Reaction Injection Molding", Technomics, Inc. (1979) as well as to the considerable patent literature on the subject.

The reaction injection molding of a thermoset resin against a thermoplastic resin preform to provide a shaped polymeric laminate article is a known technique.

As disclosed in U.S. Pat. Nos. 4,053,545, 4,784,904, 4,822,652, 4,844,944 and UK Patent Application GB 2 148 786 A, a laminate article such as a bathtub or shower tray is manufactured by placing a preformed shell or liner, e.g., a thermoformed acrylic sheet, within the cavity of a reaction injection mold and thereafter injecting a flowable thermoset resin foam-forming composition, e.g., one providing a rigid, dense microcellular polyester or polyurethane resin foam, into the mold. Following curing of the foam, a laminated product is obtained in which the thermoplastic resin preform is backed with a reinforcing layer of foamed thermoset resin.

Until now, it has been the practice to form the preform in an entirely separate molding operation employing conventional thermoforming apparatus and techniques So, e.g., in thermoforming an acrylic sheet into a bathtub shell, the sheet is heated to thermoforming temperature and thereafter conformed to the shaping surfaces of a female mold. Although it is possible to fully form the acrylic sheet against shaping surfaces of a male mold unit and thereafter clamp the female mold unit in place to provide a cavity corresponding to the shape of the polyurethane foam component to be formed therein, such a procedure is impractical since the acrylic sheet will fail to undergo any significant amount of stretching in the area in which it makes contact with the flat horizontal surface of the male mold, i.e., the section of the male mold corresponding to the floor, or bottom, of the bathtub shell. Were the bathtub shell, or preform, to be formed in this manner, the average thickness of the side walls would be a good deal less than that of the bottom of the shell, as a result of which the side walls would be readily susceptible to breakage or other damage Of course, a thicker acrylic sheet could be utilized in fabricating the preform by the foregoing procedure but this would involve a significant economic penalty since the bottom of the preform would contain more resin than required to meet any structural or functional standard.

Accordingly, in the manufacture of thermoplastic/thermoset resin laminates in which the thermoset resin component is applied to the lower surface of the thermoplastic resin preform component, it has been considered necessary to mold the preform entirely against the shaping surface of the female mold cavity of a thermoforming apparatus, remove the thermoformed preform from the mold cavity, transfer the preform to the cavity of a reaction injection molding apparatus and reaction injection mold a rigid thermoset foam reinforcing layer against the preform, i.e., the manufacturing procedures of U.S. Pat. Nos. 4,053,545, 4,784,904, 4,822,652 and 4,844,944 and UK Patent Application GB 2 148 786 A referred to above.

SUMMARY OF THE INVENTION

It is an object of the present invention to provide an integrated vacuum forming/reaction injection molding apparatus and process for forming a shaped polymeric laminate article in which a thermoplastic resin layer derived from a vacuum formed preform is backed with a reaction injection molded thermoset resin layer.

It is another object of the invention to provide such an apparatus and process in which the exposed surface of the vacuum formed preform is treated within the cavity of the sealed reaction injection mold in such manner that its molecular structure in this region undergoes modification resulting in increased bond strength between the preform and the thermoset resin backing layer which is subsequently formed against its treated surface In keeping with these and other objects of the invention, there is provided an integrated vacuum forming/reaction injection molding apparatus for forming a shaped polymeric laminate article possessing a thermoplastic resin layer and a thermoset resin layer, the thermoplastic resin layer being derived from a vacuum formed thermoplastic resin preform, the apparatus comprising:

a) a female mold unit possessing a partial mold cavity;

b) first vacuum forming means disposed within the female mold unit for initiating the vacuum forming of a vacuum formable thermoplastic resin layer against shaping surfaces of the female mold cavity to provide a partially vacuum formed preform;

c) a male mold unit which cooperates with the female mold unit to provide a sealed mold defining a complete mold cavity within;

d) second vacuum forming means disposed within the male mold unit to complete the vacuum forming of the partially vacuum formed preform against shaping surfaces of the male mold and provide a fully vacuum formed preform; and, e) means for introducing a metered amount of flowable thermoset resin-forming composition into the cavity of the sealed mold.

Further in accordance with the present invention, there is provided an integrated vacuum forming/reaction injection molding process for forming a shaped polymeric laminate article possessing a thermoplastic resin layer and a thermoset resin layer, the thermoplastic resin layer being derived from a vacuum formed thermoplastic resin preform, the process comprising:

a) initiating the vacuum forming of a vacuum formable thermoplastic resin layer against shaping surfaces of the cavity of a female mold unit to provide a partially vacuum formed preform;

b) completing the vacuum forming of the partially vacuum formed preform against shaping surfaces of a male mold unit to provide a fully vacuum formed preform;

c) joining the male and female mold elements with the fully vacuum formed preform in adherent contact with shaping surfaces of the male mold unit to provide a sealed mold defining a complete mold cavity within, the exposed lower surface of the preform providing a portion of the shaping surfaces of the complete mold cavity;

d) introducing a metered amount of flowable thermoset resin-forming composition into the cavity of the sealed mold; and, e) polymerizing polymerizable components of the thermoset-resin forming composition to provide the shaped polymeric laminate article Unlike the reaction injection molding apparatus and processes of the prior art which employ thermoformed thermoplastic resin preforms, the integrated vacuum forming/reaction injection molding apparatus and process of the present invention employs the same molding apparatus for both the vacuum forming and the reaction injection molding operations and utilizes both mold elements to accomplish the vacuum forming of the preform in a multi-step operation which is completed upon the shaping surfaces of the male mold unit. This arrangement is highly advantageous from a practical as well as economic standpoint. Initiating the vacuum forming of the preform upon shaping surfaces of the female mold unit and completing the vacuum forming of the preform upon the shaping surfaces of the male mold unit provides substantially uniform stretching, and accordingly, substantially uniform thickness, of all regions of the preform and assures a perfect fit between the shaping surfaces of the male mold unit and the upper surface of the preform. The economic advantages of combining two separate manufacturing operations in a single apparatus and process are readily apparent, the reduced capital investment, simplified maintenance and lower labor costs resulting in substantial economic benefits compared with two distinct manufacturing systems as in the case of the laminated article manufacturing operations described in UK Patent Application GB 2 148 786 A referred to above.

Figure 1:
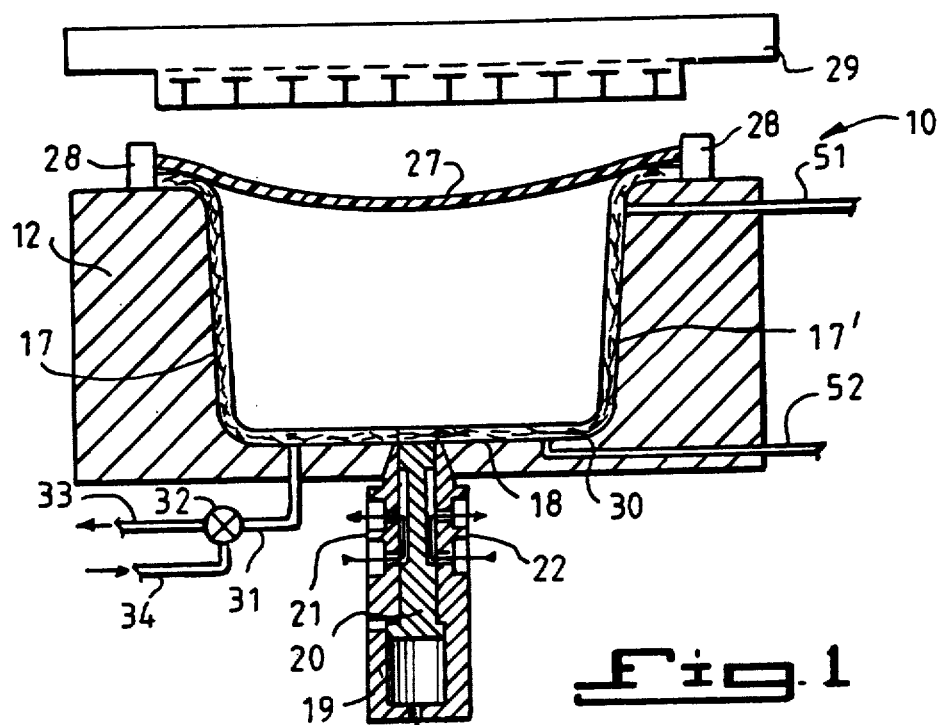
FIGS. 1-6 are schematic cross sectional illustrations of the following stages of operation of the integrated vacuum forming/reaction injection molding apparatus of this invention for providing a polymeric resin laminate article, specifically, a bathtub, shown in cross sectional perspective view in FIG. 6A.
Figure 2:
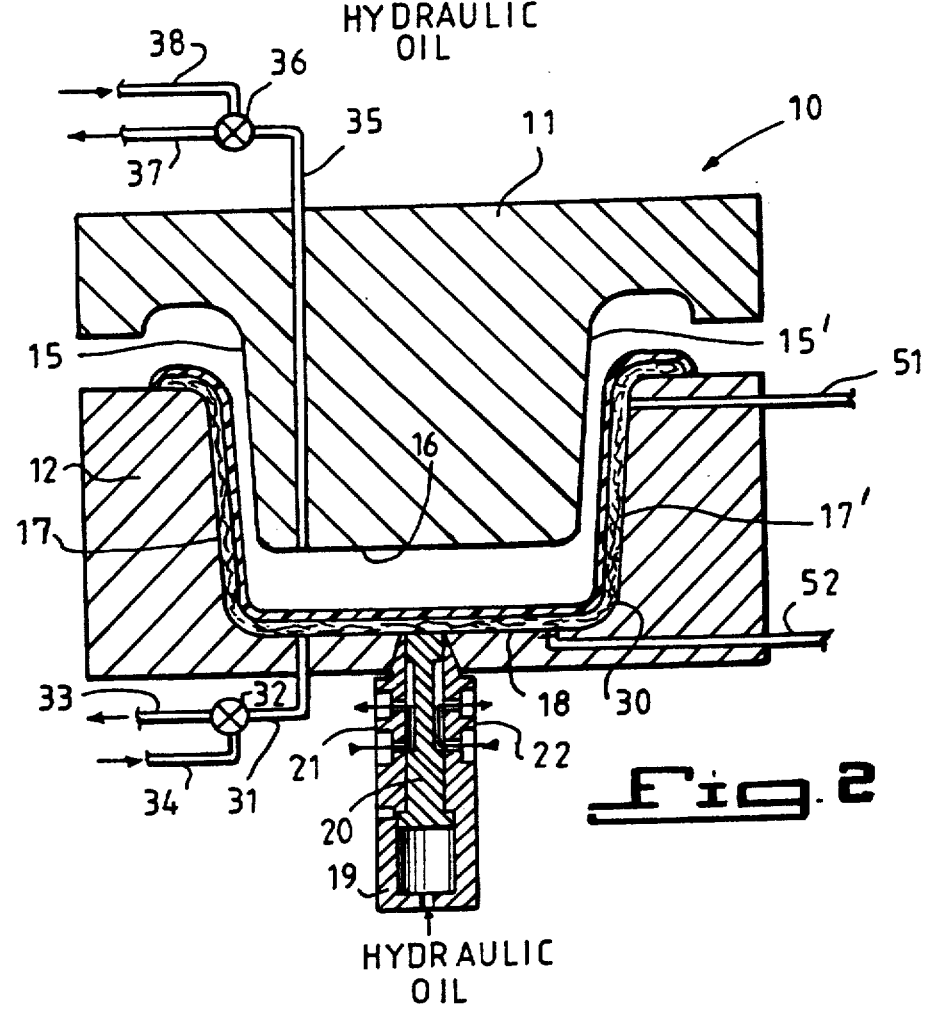
Figure 3:
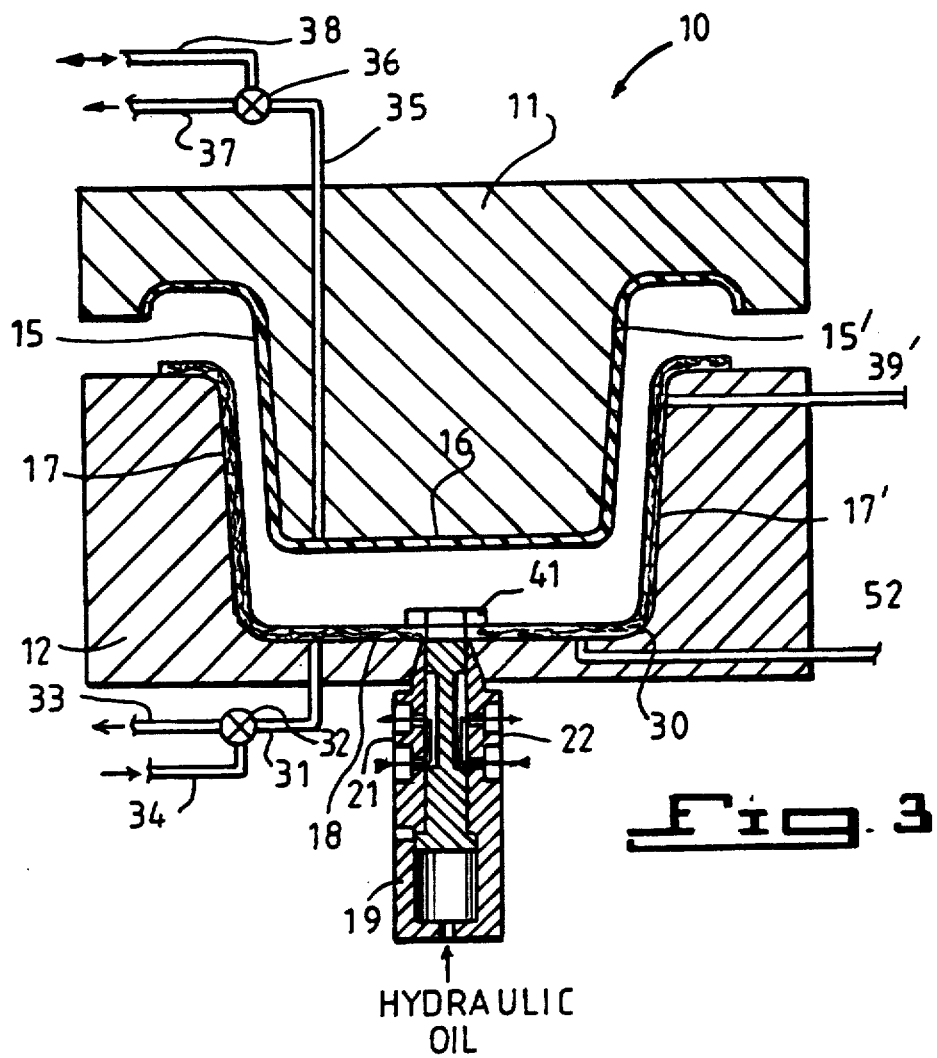
Figure 6A:
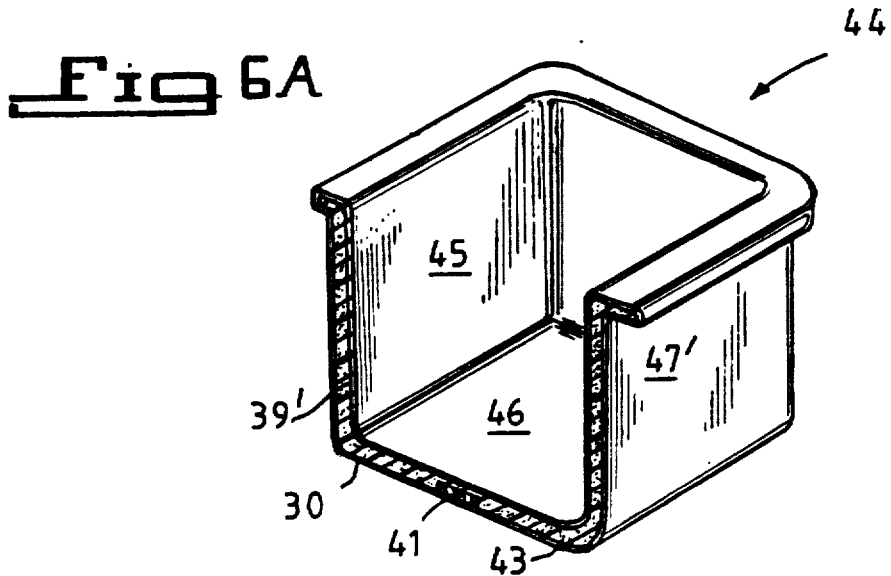
Figure 4:
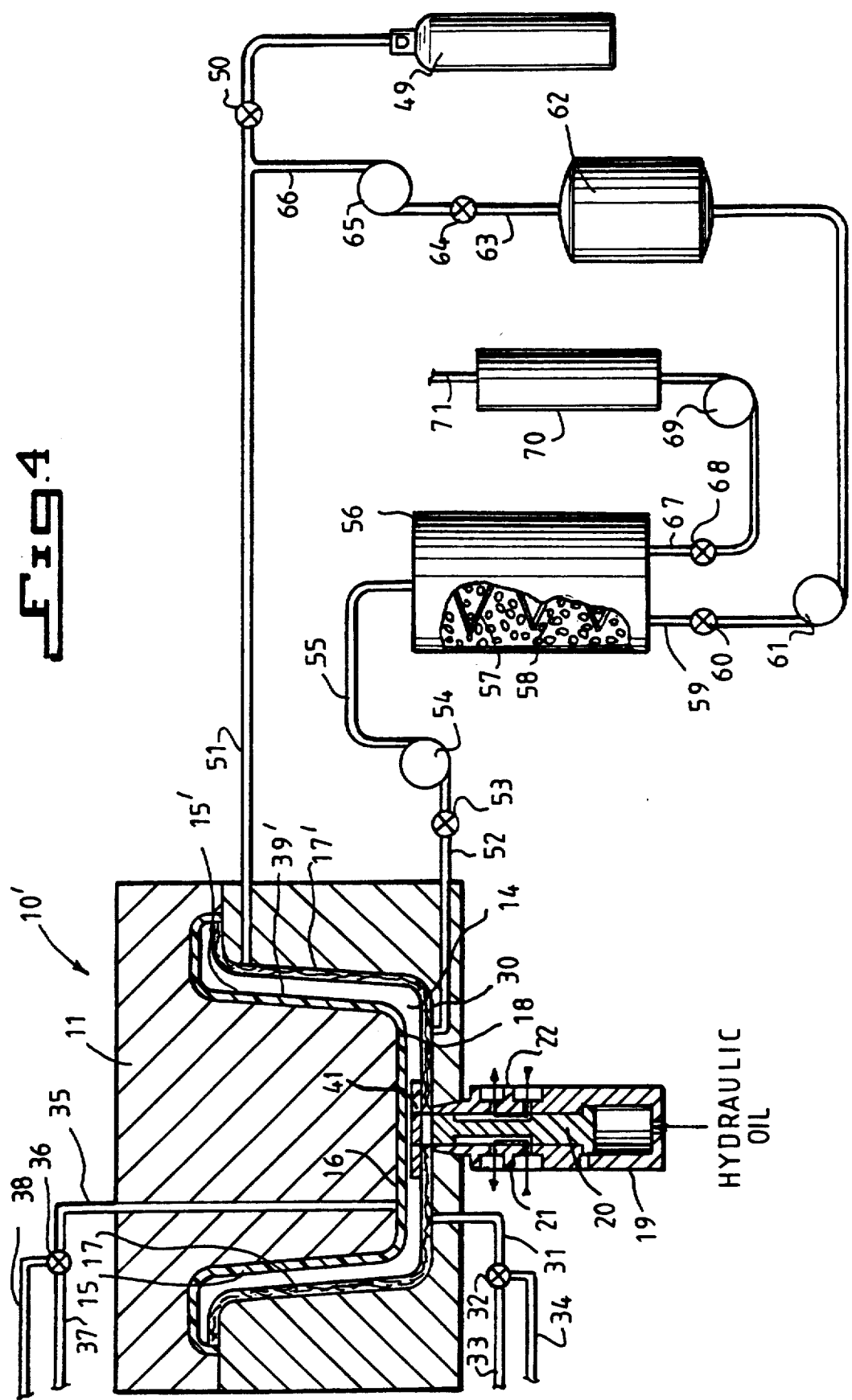
Figure 5:
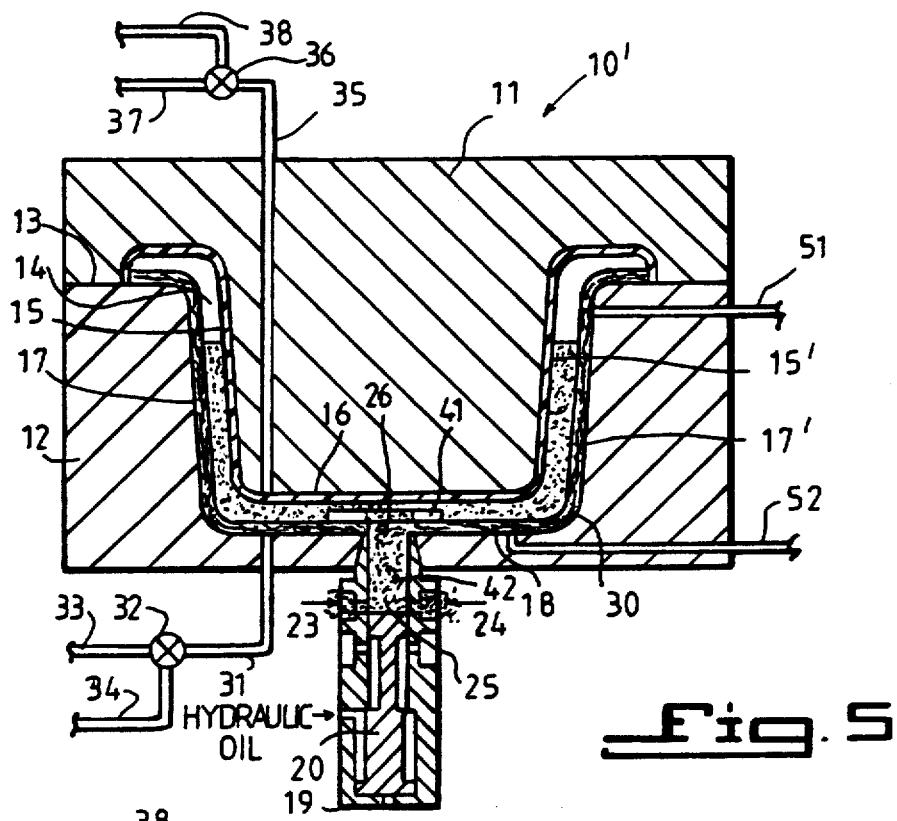
Figure 6:
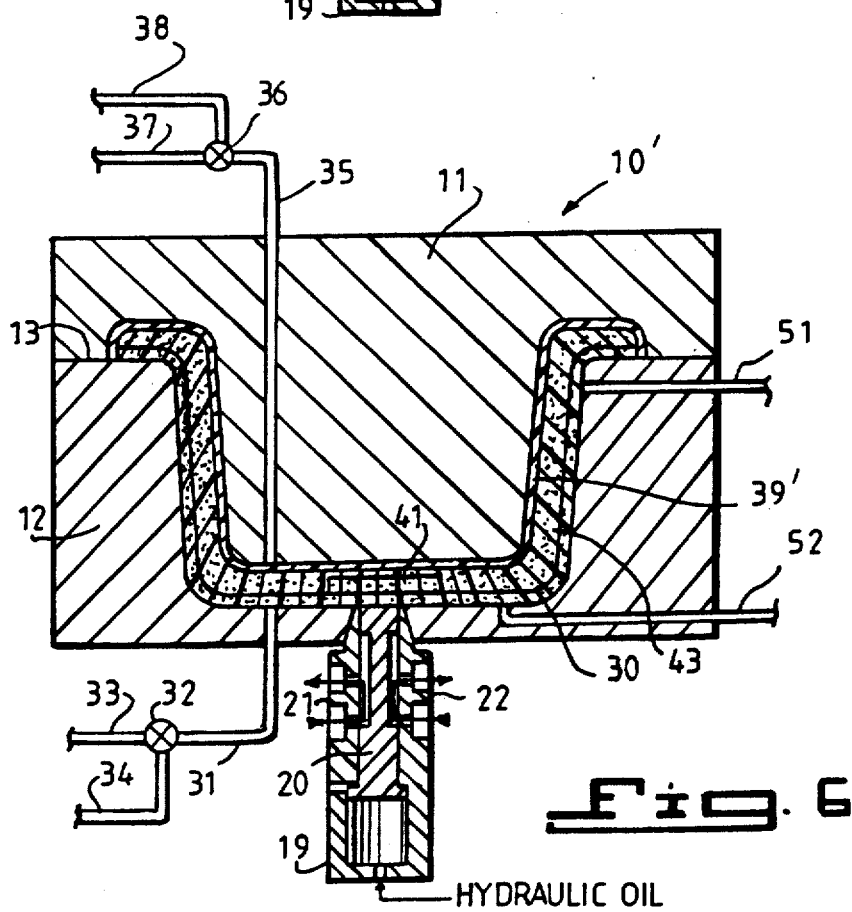

initial vacuum forming step providing a partially vacuum formed preform (FIG. 1);

positioning of the male mold element (plug) of the reaction injection molding apparatus relative to the female mold unit thereof in preparation for the final vacuum forming step (FIG. 2);

final vacuum forming step providing a fully vacuum formed preform (FIG. 3);

optional step of treating the exposed surface of the preform within the cavity of the sealed reaction injection molding apparatus with a chemically reactive gaseous mixture in order to modify the molecular structure of the resin in such region and improve its adhesion for a thermoset resin which is subsequently formed against the adhesion-improved surface (FIG. 4);

mold cavity filling, or injection, step of the reaction injection molding operation (FIG. 5); and, curing step of the reaction injection molding operation providing the finished bathtub (FIG. 6).

In the foregoing figures, the same numerals are used throughout to refer to the following elements

| Reference Numeral | Element |
|---|---|
| 10 | integrated vacuum forming/reaction injection molding apparatus set up in the vacuum forming configuration (FIGS. 1-3) |
| 10' | integrated vacuum forming/reaction injection molding apparatus set up in the reaction injection molding configuration (FIGS. 4-6) |
| 11 | male mold unit (plug) |
| 12 | female mold unit |
| 13 | parting line of sealed mold |
| 14 | mold cavity |
| 15 and 15' | male mold unit shaping surfaces corresponding to interior side wall surfaces 45 and 45' of finished bathtub 44 |
| 16 | male mold unit shaping surface corresponding to interior bottom surface 46 of finished bathtub 44 |
| 17 and 17' | female mold unit shaping surfaces corresponding to exterior side wall surfaces 47 and 47' of finished bathtub 44 |
| 18 | female mold unit shaping surface corresponding to exterior bottom surface 48 of finished bathtub 44 |
| 19 | two-component mixing head unit for injecting a metered amount of flowable, substantially homogeneous thermoset resin-forming composition 42, e.g., one providing a rigid, dense microcellular polyurethane foam, into mold cavity 14 |
| 20 | hydraulic piston |
| 21 | low pressure recirculation path for thermoset resin Component A, e.g., polyol (FIGS. 1-4 and 6) |
| 22 | low pressure recirculation path for thermoset resin Component B, e.g., polyisocyanate (FIGS. 1-4 and 6) |
| 23 | high pressure impingement mixing/injection path for thermoset resin Component A (FIG. 5) |
| 24 | high pressure impingement mixing/injection path for thermoset resin Component B (FIG. 5) |
| 25 | impingement mixing zone (FIG. 5) |
| 26 | injection port |
| 27 | vacuum formable thermoplastic resin sheet, |

-continued

| Reference Numeral | Element |
|---|---|
| | e.g., one fabricated from an acrylic resin such as poly(methyl methacrylate) (PMMA) |
| 28 | clamp frame for suitably positioning resin sheet 27 relative to the cavity of female mold unit 12 and oven 29 |
| 29 | oven with radiant heating elements for bringing resin sheet 27 to vacuum forming temperature |
| 30 | permeable mold insert, e.g., a self-supporting, permeable glass fiber web preform |
| 31 | combined vacuum/pressurized air line for female mold unit 12 |
| 32 | valve |
| 33 | vacuum line |
| 34 | pressurized air line |
| 35 | combined vacuum/pressurized air line for male mold unit 11 |
| 36 | valve |
| 37 | vacuum line |
| 38 | pressurized air line |
| 39 | partially vacuum formed thermoplastic resin preform temporarily supported on the surface of glass fiber web preform 30 |
| 39' | fully vacuum formed thermoplastic resin preform maintained in vacuum-adherent contact against the shaping surfaces of male mold unit 11 |
| 40 | exposed surface of thermoplastic resin preform 39' |
| 41 | plywood plank imparting additional longitudinal rigidity to finished bathtub 44 |
| 42 | flowable thermoset resin-forming composition formed in impingement mixing zone 25 |
| 43 | cured thermoset resin backing layer bonded to surface 40 of preform 39' |
| 44 | finished bathtub (shown in cross sectional perspective view in FIG. 6A) |
| 45 and 45' | interior side wall surfaces of finished bathtub 44 |
| 46 | interior bottom surface of finished bathtub 44 |
| 47 and 47' | exterior side wall surfaces of finished bathtub 44 |
| 48 | exterior bottom surface of finished bathtub 44 |
| 49 | pressurized source of fluorine gas |
| 50 | valve |
| 51 | fluorine gas input line |
| 52 | fluorine-air mixture evacuation line |
| 53 | valve |
| 54 | transfer pump |
| 55 | fluorine-air mixture transfer line |
| 56 | main fluorine separation unit selectively operated in fluorine sorption and fluorine desorption modes |
| 57 | electric heating coil selectively operated at fluorine sorption and fluorine desorption temperatures |
| 58 | fluorine-sorptive material, e.g. sintered pellets of anhydrous potassium nickel hexafluoride |
| 59 | desorbed fluorine transfer line |
| 60 | valve |
| 61 | transfer pump |
| 62 | desorbed fluorine holding tank |
| 63 | desorbed fluorine transfer line |
| 64 | valve |
| 65 | transfer pump |
| 66 | desorbed fluorine recycle line |
| 67 | residual fluorine-air mixture transfer line |
| 68 | valve |
| 69 | transfer pump |
| 70 | auxiliary fluorine separation unit |
| 71 | vent for fluorine-free air |

DESCRIPTION OF THE PREFERRED EMBODIMENTS

FIGS. 1-6 illustrate in cross section the configuration of the apparatus of the invention, indicated generally at 10, at various stages of the vacuum forming operation (FIGS. 1-3) and the configuration of the apparatus, indicated generally at 10', at various stages of the reaction injection molding operation (FIGS. 4-6). FIG. 6 illustrates the finished polymeric resin laminate article, bathtub 44, ready for demolding and FIG. 6A illustrates in perspective view a section of the demolded bathtub of FIG. 6.

As shown in FIG. 1 of the drawings, female mold unit 12 possesses shaping surfaces 17 and 17' corresponding to exterior side wall surfaces 47 and 47' of finished bathtub 44 and shaping surface 18 corresponding to the exterior bottom surface 48 of finished bathtub 44. Female mold unit 12 is provided with a combined vacuum/pressurized air line 31 which terminates in one or more orifices at its shaping surfaces 17, 17' and/or 18. Combined vacuum/pressurized air line 31 selectively communicates through valve 32 with vacuum line 33 and pressurized air line 34. In the embodiment of the apparatus shown, female mold unit 12 is also provided with fluorine gas input line 51 and fluorine-air mixture evacuation line 52 each of which terminates in one or more orifices at suitable location(s) of the shaping surface(s) of female mold unit 12. The functional significance of lines 51 and 52 will be explained in detail in connection with the embodiment of FIG. 4.

A permeable mold cavity insert 30 of sufficient rigidity and resistance to deformation is advantageously utilized in the initial vacuum forming stage which is carried out upon cut thermoplastic resin sheet 27 suitably positioned upon, and sealed along the periphery of, female mold unit 12 by clamp frame 28. When insert 30 is employed in the vacuum forming operation, the expression "shaping surfaces of the female mold cavity" shall be understood to refer to exposed surfaces of the insert. Insert 30 can be removed from the cavity of female mold unit 12 and reused in subsequent vacuum forming operations In the embodiment shown, insert 30 is provided as a self-supporting, permeable glass fiber web preform which remains in the cavity of the female mold unit and is ultimately incorporated in the thermoset layer of the finished laminate product to serve as a fibrous reinforcement therein Thermoplastic resin sheet 27 can be fabricated from any of a large variety of thermoformable materials, e.g., polyolefin homopolymers and/or copolymers such as linear low density polyethylene, high density polyethylene, polypropylene, ethylene-propylene copolymer, etc.; polyvinyl ethers; poly(phenylene ethers); acetal resins; thermoplastic polyesters such as polyethylene terephthalate and polybutylene terephthalate; polycarbonates; thermoplastic polyamides such as nylon 6 and nylon 6/6; thermoplastic polyurethanes; polyvinylhalides such as polyvinyl chloride and polytetrafluoroethylene; polyvinylidene halides such as polyvinylidene chloride; halogenated polyolefins such as chlorinated polyethylene; acrylic homopolymers and copolymers such as poly(methyl methacrylate); ionomer resins; polystyrenes; polyacrylonitriles; polyvinylesters such as polyvinylacetate; polyimides; polyetherimides; polysulfones; cellulose esters such as cellulose acetate, cellulose acetate butyrate and cellulose acetate propionate; interpenetrating polymer networks (IPNs) and simultaneous interpenetrating polymer networks (SINs); and polymer alloys or blends of any of the foregoing. The resins can, if desired, contain one or more additives of the usual kind, e.g., fillers, fibrous reinforcements, processing aids, colorants, pigments, stabilizers, etc., in the usual amounts. In view of its application as the surface, or cosmetic, layer of finished bathtub 44, thermoplastic resin sheet 27 is advantageously fabricated from a thermoplastic resin exhibiting good flame retardancy, heat and moisture resistance, scratch resistance, detergent resistance, impact strength and colorability and, in addition to such useful physical properties, pleasing appearance and high gloss Acrylic resins such as poly(methyl methacrylate) (PMMA) are particularly advantageous due to their high degree of compliance with the foregoing criteria, the relative ease with which they can be thermoformed to provide shapes such as those of preform 39', their low cost compared to other resins exhibiting similar properties and their ready availability.

Oven 29 possessing an array of radiant heating elements is employed in bringing thermoplastic resin sheet 27 to a temperature suitable for vacuum forming. Oven 29 can possess control means to regulate the temperature of the heating elements and/or to heat thermoplastic resin sheet 27 to different temperatures at different locations of its surface. Once raised to the vacuum forming temperature, a vacuum drawn on line 33 across valve 32 and on line 31 against the lower surface of thermoplastic resin sheet 27 draws the sheet against the exposed surface of glass fiber web preform 30 providing partially vacuum formed preform 39. Either before, during or just after the initial vacuum forming step is carried out upon thermoplastic resin sheet 27, oven 29 and female mold unit 12 are shifted away from each other in preparation for the final step of the vacuum forming operation shown in FIG. 2.

As illustrated in FIG. 2, male mold unit 11 possesses shaping surfaces 15 and 15' corresponding to interior side wall surfaces 45 and 45' of finished bathtub 44 and shaping surface 16 corresponding to interior bottom surface 46 of finished bathtub 44. Similarly as in female mold unit 11, male mold unit 12 features a combined vacuum/pressurized air line 35 terminating in one or more orifices at its shaping surfaces 15, 15' and/or 16, valve 36, vacuum line 37 and pressurized air line 38. In the first phase of the final vacuum forming step, male mold unit 11 is placed in proximity to partially vacuum formed preform 39, e.g., from about 1 to about 10 cm from the upper surface thereof. The completion of the final vacuum forming step is shown in FIG. 3. There, a vacuum drawn on line 37 across valve 36 and on line 35 and applied against the upper surface of partially vacuum formed preform 39 draws the preform against shaping surfaces 15, 15' and 16 of male mold (/(-. unit 11 to provide fully vacuum formed thermoplastic resin preform 39' which is maintained in vacuum-adherent contact with such shaping surfaces. If desired, application of the vacuum to the upper surface of partially vacuum formed preform 39 can be accompanied by a brief application of pressurized air through line 34 across valve 32 and through line 31 to facilitate the upward displacement of preform 39 from its nested position within the cavity of female mold unit 12. If desired, suitable means can be provided to retain insert 30 within the cavity of female mold unit 12 while preform 39 is being drawn upwardly against the shaping surfaces of male mold unit 11.

As illustrated in FIG. 4, male mold unit 11 has been joined with female mold unit 12 along parting line 13 to provide sealed mold 10' with mold cavity 14 defined therein During the mold cavity filling operation, as thermoset resin-forming composition 42 fills mold cavity 14, it displaces the atmosphere within the mold cavity forcing it through parting line 13 or, if valve 53 is in the open position, through evacuation line 52. The exposed surface of preform 39' and female cavity shaping surfaces 17, 17' and 18 constitute the shaping surfaces for cured thermoset resin layer 43 which is to be formed in mold cavity 14. In the context of this invention, the term "cured" is intended to refer to an advanced state of polymerization at which the thermoset resin is self-supporting and can be demolded If not already present with the cavity of female mold unit 12, self-supporting, permeable glass fiber web preform 30 is placed within such cavity prior to joining of the mold elements to provide sealed mold 10'. Preform 30 possesses an overall configuration corresponding approximately to that of finished bathtub 44. In addition to glass, preform 30 can be fabricated from any of a variety of other fibrous reinforcement materials such as ceramic fiber, asbestos fiber, metallic fiber, carbon fiber, aramid fiber, etc. Preform 30 can be woven or non-woven and can be manufactured from continuous strand or chopped fiber One suitable method for providing glass fiber web preform 30 is disclosed in U.K. Patent Application GB 2 015 915 A, the contents of which are incorporated by reference herein. As applied to the fabrication of preform 30, this method comprises supplying chopped glass fiber to a jet of finely-divided liquid, e.g., water, containing a temporary binder for the glass fiber, e.g., polyvinyl acetate, directing the jet against the surface of a former to build up preform 30 thereon to the desired thickness and, finally, drying the preform. If desired, one or more longitudinal stiffeners, e.g., plywood plank 41, is placed upon glass fiber web preform 30 to be incorporated in bathtub 44 where it provides an additional measure of flex and bending resistance. Glass fiber web preform 30 and optional plank 41 each possesses a passageway in common alignment with injection port 26. These passageways facilitate the flow of thermoset resin-forming composition 42 into mold cavity 14 during the injection operation.

Before coming into contact with flowable thermoset resin-forming composition 42, exposed surface 40 of vacuum formed thermoplastic resin preform 39' is given an adhesive coating and/or is otherwise treated to improve its adherent property for the mutually contacting surface of cured thermoset resin backing layer 43. In the embodiment of the invention illustrated in FIG. 4, the adherent property of exposed surface 40 of preform 39' is improved by modifying its molecular structure without, however, affecting the properties of the bulk resin.

A variety of procedures are known for modifying the surface of a thermoplastic resin which can be utilized herein to provide the aforementioned adhesion-improved surface. Thus, e.g., exposed surface 40 of rigid thermoplastic resin preform 39' can be subjected to gas plasma treatment or other energetic electron bombardment treatment which results in the modification of the polymer in this region. One such treatment involves the application of an electrical discharge to surface 40 under appropriate conditions, e.g., a voltage of from about 100 to about 200 volts at a static capacity of about 40 to about 100 microfarads and at a short circuit current of from about 1 to about 2 amperes.

Useful gas plasma treatments involve contacting surface 40 with partially ionized gases containing equal concentrations of positive and negative charge carriers produced by strong electric or magnetic fields. The plasmas can be produced at relatively low temperature, e.g., from ambient temperature to about 160° C., by corona discharge at atmospheric pressure or by radio frequency glow discharge at low pressure, e.g., 10 torr or less, for treatment times of from about 0.1 seconds to several minutes in the presence of such gases as oxygen, nitrogen and/or nitrogen-containing compounds such as nitrogen oxide, an amine, an imide, an amide, etc., a sulfur-containing compound such as sulfur dioxide, sulfur trioxide, etc., helium, argon, halogen and/or halogen-containing compounds, the use of which in gas plasma treatment of polymer surfaces is known (see, e.g., U.S. Pat. Nos. 4,312,693; 4,315,808; 4,317,788; 4,452,679; 4,548,867; 4,690,097; 4,714,650; 4,820,580; 4,828,871; and, 4,836,901 and, Coopes et al., "Gas Plasma Treatment of Polymer Surfaces", *J. Macromol. Sci.-Chem.*, A17(2), pp. 217–226 (1982), the disclosures of which are incorporated by reference herein).

Several purely chemical procedures which can be adapted herein to effect the molecular modification of surface 40 of thermoplastic resin preform 39' are described in U.S. Pat. Nos. 4,752,428; 4,771,110; and, 4,800,053, the contents of which are incorporated by reference herein These procedures utilize a gaseous mixture comprising fluorine and/or a fluorine-containing gas and at least one other reactive gas, e.g., oxygen conveniently supplied as ambient atmosphere, within a sealed reaction chamber. In the case of a preferred gaseous mixture, namely, fluorine and oxygen, the atmosphere within the sealed treatment chamber can contain from about 0.1 to about 50 mole percent fluorine and at least about 100 ppm oxygen. Pressure and/or temperature within the treatment chamber can be maintained below, at or above ambient with contact times of only a fraction of a second up to several seconds, even minutes, ordinarily being sufficient to improve the adhesion property of exposed surface 40 of preform 39'.

In each of the foregoing surface treatment procedures, only the polymeric structure of the resin at the surface region of preform 39' is affected, the remaining resin remaining unaltered by such treatments. In general, the modified molecular structure will extend to a depth of only a few nanometers, e.g., to about 10 nanometers at most and usually not more than about 5 nanometers. Without wishing to be bound, it is believed that this molecular modification of the surface polymer results in the formation of chemically reactive functional groups, e.g., carboxylic acid groups, hydroxyl groups, carbonyl groups, etc., which react with chemically reactive functional groups possessed by one or more components of the thermoset resin-forming composition subsequently placed in contact with the molecularly-modified surface 40 of thermoplastic resin preform 39'. The chemical reaction is believed to result in strong covalent bonds which chemically bond the mutually contacting surfaces of the two layers to each other.

The treatment of exposed surface 40 of preform 39' by these or other polymer structure-modifying procedures can be carried out either in a separate upstream operation or, as in the embodiment of the invention illustrated in FIG. 4, within cavity 14 of sealed reaction injection mold 10', e.g., employing a reactive gaseous mixture of fluorine and oxygen (provided as ambient air) in accordance with the chemical surface modification procedures referred to above. In accordance with this embodiment of the invention, a stream of fluorine gas from pressurized cylinder 49 controlled by valve 50 is introduced into mold cavity 14 via line 51 where it mixes with oxygen present in the air already present in the cavity to provide the preferred reactive gaseous composition referred to above. Following the desired period of contact with the gaseous fluorine-oxygen mixture, the adhesion property of exposed surface 40 of preform 39' will have been improved, possibly by having become chemically reactive for one or more components of thermoset resin-forming composition 42 which is introduced into mold cavity 14 in the subsequent reaction injection molding operation (FIGS. 5 and 6). Thus, when thermoset resin-forming composition 42 is one providing a polyurethane, polyurethane-polyurea, polyurea, or polyester-polyurethane hybrid resin and as such contains a polyisocyanate component, it is thought that treated surface 40 of preform 39' chemically reacts with this component to provide a laminate article, in the case illustrated, bathtub 44, in which preform 39' is chemically bonded to underlying cured thermoset layer 43 at their mutually contacting surfaces.

For the foregoing embodiment, the materials of construction of mold 10' should be selected with resistance to fluorine corrosion in mind. Metals such as Monel, aluminum, stainless steel and carbon steel, preferably stainless steel, are suitable materials for the construction of article shaping surfaces, transfer lines, etc. Alternatively, the surfaces of mold components which come into contact with fluorine can be coated with a corrosion-resistant material, e.g., a highly fluorinated polymer such as polytetrafluoroethylene (PTFE). Such polymers are also suitable for use in the construction of gaskets, and the like, which may come into contact with gaseous fluorine.

Following the surface treatment of preform 39', excess fluorine together with the gas with which it is admixed, e.g., air, is evacuated from mold cavity 14 through line 52, either before or during the filling of the mold cavity with flowable thermoset resin-forming composition 42, and is conveyed by pump 54 across valve 53 through transfer line 55 to main fluorine separation unit 56 which is operated under conditions providing the removal of at least a major amount of the fluorine from the other gas. The fluorine-depleted gas is thereafter conveyed through line 67 across valve 68 by pump 69 to and through auxiliary fluorine separation unit 70 where any residual fluorine is completely removed, the fluorine-free gas being vented therefrom through line 71. When, as in this embodiment, a main fluorine separation unit is accompanied by one or more auxiliary fluorine separation units, the expression "fluorine separation unit" shall be understood to refer to the entire arrangement of such individual units Main fluorine separation unit 56 can utilize any one of a variety of known and conventional methods for the removal of fluorine including scrubbing with caustic, e.g., aqueous potassium hydroxide, and/or reaction with one or more solid fluorine-reactive materials such as charcoal, caustic-impregnated activated carbon, alumina, calcium carbonate, calcium oxide and soda lime. In the embodiment shown and in accordance with the disclosure of U.S. Pat. No. 4,292,289, the contents of which are incorporated by reference herein, main fluorine separation unit 56 is provided as a sorption/desorption unit filled with sintered pellets 58 of anhydrous potassium nickel hexafluoride which converts to potassium nickel heptafluoride upon sorption of fluorine at a first elevated temperature, e.g., from about 225° to about 250° C., and fluorine residence times of from about 100 to about 1000 seconds with fluorine removal efficiencies of from about 60 to about 90 percent. At a second more elevated temperature, e.g., from about 350° C. to about 500° C., potassium nickel heptafluoride will release sorbed fluorine of high purity, e.g., of greater than about 99 percent purity, which is entirely suitable for recycle. Thus, the operation of unit 56 can be readily switched from the fluorine sorption mode to the fluorine desorption mode and vice versa simply by adjusting the internal temperature of the unit to within the range required by the particular mode of operation desired. Electric heating coil 57 is one suitable means for providing such temperature control. During operation of unit 56 in the fluorine desorption mode, desorbed fluorine is conveyed from unit 56 through transfer line 57 across valve 60 by pump 61 to desorbed fluorine holding tank 62. When the use of recycled fluorine is desired, pump 65 transfers desorbed fluorine from holding tank 62 through line 63 across valve 64 and through lines 66 and 51 into mold cavity 14. Operation of main fluorine sorption/desorption unit 56 makes it possible to repeatedly recycle excess fluorine with only periodic additions of fresh fluorine from cylinder 49 being necessary to make up for the relatively small amounts of fluorine which are actually consumed in any one cycle of the preform surface treatment operation. Any fluorine not sorbed in main fluorine separation unit 56 is completely and irreversibly sorbed in auxiliary fluorine separation unit 70 operated in any known manner, e.g., as described in any of U.S. Pat. Nos. 2,515,112; 4,215,096; and, 4,594,231, the contents of which are incorporated by reference herein. The gas released through vent line 71 is entirely free of fluorine and as such is environmentally safe.

A complete cycle of operation of the integrated vacuum forming/reaction injection molding apparatus of the present invention to provide finished bathtub 44 will now be described. As shown in FIG. 1, acrylic sheet 27 is heated to vacuum forming temperature by oven 29, the sheet assuming its initial vacuum formed configuration 39 as shown in FIG. 2. To complete the vacuum forming operation and as shown in FIG. 3, pressurized air is admitted by valve 32 through lines 34 and 31 forcing partially vacuum formed preform 39 away from the shaping surfaces of mold insert 30 (a self-supporting, permeable glass fiber web preform which is eventually incorporated into the structure of bathtub 44 as a reinforcement for the thermoset resin backing layer) and toward the shaping surfaces of male mold unit 11 positioned in proper alignment with female mold unit 12. Simultaneously with the demolding of partially vacuum formed preform 39, a vacuum drawn on line 37 across valve 36 and on line 35 causes preform 39, still at vacuum forming temperature, to assume full vacuum-adherent contact with shaping surfaces 15, 15' and 16 of male mold unit 11, the final stretching and shaping of the preform resulting in fully vacuum formed preform 39'. Prior to joining mold elements 11 and 12, a plywood plank 41 is positioned upon glass fiber web preform 30 in such a manner as to subsequently become incorporated into the structure of bathtub 44 as a longitudinal stiffener therefor. If a contact adhesive is to be applied to exposed surface 40 of preform 39', it can be applied at this time. However, as previously described in connection with the embodiment of FIG. 4, it is preferred to surface-treat exposed surface 40 of the preform within cavity 14 of sealed mold 10' with a reactive gaseous mixture of fluorine and oxygen to render such surface chemically reactive and capable of forming a chemical bond with subsequently formed thermoset resin layer 43. Following sealing of the mold, fluorine gas from cylinder 49 or holding tank 62 is introduced into mold cavity 14 as previously described where it mixes with the oxygen of the resident air in the cavity, the resulting mixture effecting the chemical activation of exposed surface 40 of preform 39'. Upon completion of the surface treatment operation, excess fluorine in mold cavity 14 together with the gas with which it is admixed, e.g., air, is conveyed therefrom to main fluorine separation unit 56 where most of the fluorine is removed with complete fluorine removal being achieved in auxiliary fluorine separation unit 70 as previously described. Evacuation of the fluorine-containing gas from mold cavity 14 through line 52 at the conclusion of the surface treatment operation can be accomplished by pump 54 or by introduction of thermoset resin-forming composition 42 into mold cavity 14 during the injection operation, preferably the former. In the case where the fluorine-containing atmosphere in mold cavity 14 is evacuated therefrom prior to the mold cavity filling operation, air drawn into mold cavity 14 through parting line 13 and/or through a one-way valve (not shown) will displace the fluorine-containing gas as it is withdrawn through line 52 by pump 54. Then, during the mold filling operation, in-coming thermoset resin-forming composition 42 will itself displace the air in cavity 14 forcing the air through parting line 13 and/or other suitable gas venting means.

As shown in FIG. 4, sealed reaction injection mold 10' is in the recirculation mode of operation with reaction Component A, e.g., polyol, recirculating along path 21 of mixing head 19 and reaction Component B, e.g., polyisocyanate, recirculating along path 22 of the mixing head. In the injection mode of operation shown in FIG. 5, hydraulic piston 20 has been drawn away from injection port 26 permitting Components A and B to become substantially completely mixed in impingement mixing zone 25 thereby forming thermoset resin-forming composition 42. At the conclusion of the injection cycle and as shown in FIG. 6, piston 20 returns to the recirculation position. Within minutes depending on the polymerization characteristics of the particular thermoset resin-forming composition being processed, cured thermoset resin 43 is obtained. Demolding of bathtub 44 can be accomplished in a variety of ways and is advantageously achieved by partially separating mold elements 11 and 12 and thereafter simultaneously directing pressurized air through line 31 of female mold unit 12 against the lower surface(s) of the bathtub and a vacuum through line 35 of male mold unit 11 against the upper surface(s) of the bathtub such that bathtub 44 becomes vacuum-held by mold unit 11. Mold element 11 can then be shifted to a demolding position with termination of the vacuum and, optionally, brief application of pressurized air through line 35 against the upper surface(s) of the bathtub, being sufficient to dislodge the bathtub from the mold unit.

For finished bathtub 44, it is preferred to employ a flowable resin-forming composition containing an unsaturated polyester, an unsaturated monomer such as styrene and a polyisocyanate such as MDI or TDI and which on curing provides a rigid, dense microcellular polyester-polyurethane hybrid foam. Foam densities of from about 200 to about 800 kg/m$^3$, and preferably from about 300 to about 600 kg/m$^3$, are generally suitable for thermoset resin backing layer 43 of bathtub 44 and the backing layer of other sanitary ware products. The polyester-polyurethane hybrid resin-forming composition can also contain one or more additional components such as catalyst for the isocyanate addition reaction, free radical initiator, non-reinforcing particulate filler, chopped fiber reinforcement (whether or not glass fiber web 30 is also employed), extender such as a hydrocarbon oil, flame retardant such as alumina trihydrate, surface active agent, physical blowing agent such as carbon dioxide, halocarbon, and the like, chemical blowing agent such as water and the like, in the usual amounts. Compositions of this type are known, e.g., from U.S. Pat. Nos. 3,823,099; 3,882,189; 4,216,294; 4,280,979; 4,358,548; 4,374,229; 4,822,849; 4,844,944; and, 4,844,855, the disclosures of which are incorporated by reference herein. Other thermoset resins which can be utilized in the laminate of this invention include polyurethanes, polyurethane- polyureas, polyureas, epoxy resins, allyl resins, thermosetting polyesters, thermosetting polyamides, polycaprolactone/polyether hybrids, thermosetting acrylic resins, and the like.

Due, it is believed, to chemical reaction between one or more components of thermoset resin-forming composition 42 and molecularly modified surface 40 of preform 39', the resulting finished bathtub 44 possesses an attractive outer thermoplastic layer chemically bonded to an underlying fiber-reinforced and longitudinal stringer-stiffened thermoset resin backing layer. The thickness of the two layers can vary substantially, e.g., thermoplastic resin preform 39' can possess an average thickness of from about 0.5 to about 10 mm, preferably from about 1 to about 5 mm, and cured thermoset resin layer 31' can possess an average thickness of anywhere from about 2 to about 30 times, and preferably from about 5 to about 20 times, the average thickness of preform 39'.

In addition to the manufacture of bathtubs and other items of sanitary ware such as shower receptors, lavatories, kitchen sinks, etc., the integrated vacuum forming-/reaction injection molding apparatus and process of this invention can be used to manufacture a wide variety of other molded articles of laminate construction including automotive vehicle body panels, structural panels, door panels, furniture and furniture components such as table tops and counter tops, housings for machinery and appliances, cabinets for electronic and computer equipment, and the like.

What is claimed is:

1. An integrated vacuum forming/reaction injection molding apparatus for forming a shaped polymeric laminate article possessing a thermoplastic resin layer and a thermoset resin layer, the thermoplastic resin layer being derived from a vacuum formed thermoplastic resin preform, the apparatus comprising:
    a) a female mold unit possessing a partial mold cavity;
    b) first vacuum forming means disposed within the female mold unit for initiating the vacuum forming of a vacuum formable thermoplastic resin layer against shaping surfaces of the female mold cavity to provide a partially vacuum formed preform;
    c) a male mold unit which cooperates with the female mold unit to provide a sealed mold defining a complete mold cavity within;
    d) second vacuum forming means disposed within the male mold unit to complete the vacuum forming of the partially vacuum formed preform against shaping surfaces of the male mold and provide a fully vacuum formed preform; and,
    e) means for introducing a metered amount of flowable thermoset resin-forming composition into the cavity of the sealed mold.

2. The integrated vacuum forming/reaction injection molding apparatus of claim 1 further comprising:
    f) pressurized gas delivery means disposed within the female mold member to facilitate separation of the partially vacuum formed preform from the shaping surfaces of the female mold cavity and/or to demold the finished polymeric laminate article therefrom.

3. The integrated vacuum forming/reaction injection molding apparatus of claim 1 further comprising:
    g) pressurized gas delivery means disposed within the male mold member to facilitate separation of the finished polymeric laminate article therefrom.

4. The integrated vacuum forming/reaction injection molding apparatus of claim 1 further comprising:
    h) pressurized gas delivery means disposed within the female mold member to facilitate separation of the partially vacuum formed preform from the shaping surfaces of the female mold cavity and/or to demold the finished polymeric laminate article therefrom; and,
    i) pressurized gas delivery means disposed within the male mold member to facilitate separation of the finished polymeric laminate article therefrom.

5. The integrated vacuum forming/reaction injection molding apparatus of claim 1 further comprising:
    j) means for modifying the molecular structure of polymer at the exposed surface of the fully vacuum formed preform within the cavity of the sealed mold to improve the adhesion property of such surface without appreciably affecting the properties of the bulk resin.

6. The integrated vacuum forming/reaction injection molding apparatus of claim 5 wherein means (j) includes a source of chemically reactive gas or gaseous mixture, means for introducing the chemically reactive gas or gaseous mixture into the cavity of the sealed mold to treat the exposed surface of the fully vacuum formed preform within the mold and means for venting the cavity of the sealed mold of excess chemically reactive gas or gaseous mixture prior to, or during, the introduction of flowable thermoset resin-forming composition therein.

7. The integrated vacuum forming/reaction injection molding apparatus of claim 6 wherein the source of chemically reactive gaseous mixture includes means for providing fluorine and at least one other reactive gas.

8. The integrated vacuum forming/reaction injection molding apparatus of claim 6 wherein the source of chemically reactive gaseous mixture includes means for providing fluorine and oxygen.

9. The reaction injection molding apparatus of claim 7 further comprising:
    k) means for transferring fluorine gas from the sealed mold cavity to a fluorine gas separation unit; and, l) a fluorine gas separation unit containing fluorine gas-reactive material through which excess fluorine gas transferred from the mold cavity is passed to remove fluorine gas therefrom.

10. The integrated vacuum forming/reaction injection molding apparatus of claim 9 wherein the fluorine gas-reactive material is selected from the group consisting of caustic-impregnated activated carbon, charcoal, alumina, calcium carbonate, calcium oxide and soda lime.

11. The integrated vacuum forming/reaction injection molding apparatus of claim 9 wherein the fluorine gas-reactive material is potassium nickel hexafluoride which upon sorption of fluorine gas is converted to potassium nickel heptafluoride and upon description of fluorine gas therefrom is reconverted to potassium nickel hexafluoride.

12. The integrated vacuum forming/reaction injection molding apparatus of claim 11 wherein fluorine gas separation unit (1) includes means for the desorption of sorbed fluorine gas from the potassium nickel heptafluoride and means for recycling the desorbed fluorine gas for use in a subsequent preform surface treating operation.

* * * * *